H. P. GAGE AND W. CHURCHILL.
CONDENSING SYSTEM FOR OPTICAL PROJECTING APPARATUS.
APPLICATION FILED OCT. 18, 1917. RENEWED JULY 31, 1919.
1,333,304.
Patented Mar. 9, 1920.
2 SHEETS—SHEET 1.
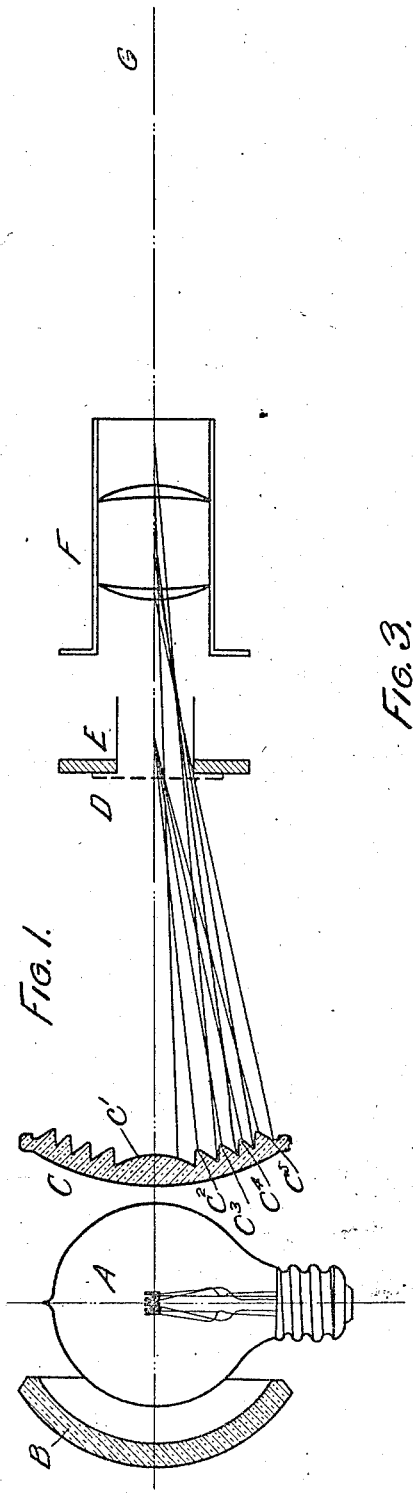
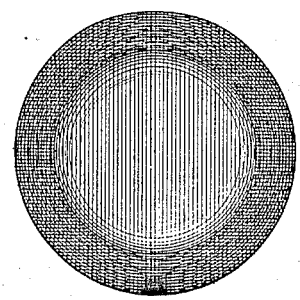
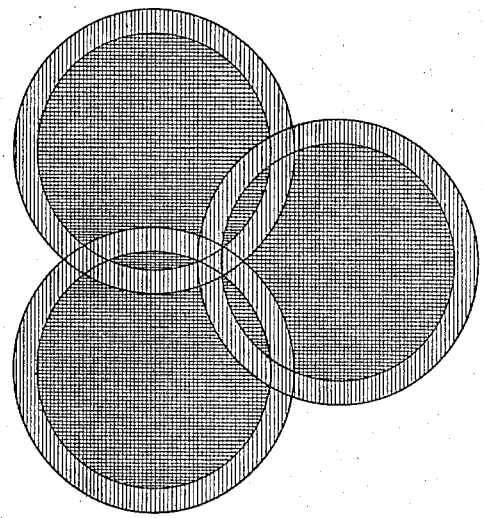
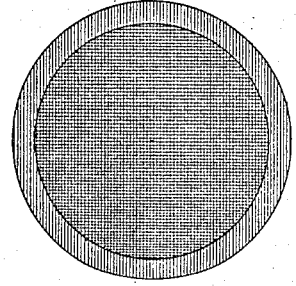

H. P. GAGE AND W. CHURCHILL.
CONDENSING SYSTEM FOR OPTICAL PROJECTING APPARATUS.
APPLICATION FILED OCT. 18, 1917. RENEWED JULY 31, 1919.

1,333,304.

Patented Mar. 9, 1920.
2 SHEETS—SHEET 2.

Inventors
Henry P. Gage
William Churchill
By Dorsey Cole
Attorney

UNITED STATES PATENT OFFICE.

HENRY PHELPS GAGE AND WILLIAM CHURCHILL, OF CORNING, NEW YORK, ASSIGNORS TO CORNING GLASS WORKS, OF CORNING, NEW YORK, A CORPORATION OF NEW YORK.

CONDENSING SYSTEM FOR OPTICAL PROJECTING APPARATUS.

1,333,304.   Specification of Letters Patent.   Patented Mar. 9, 1920.

Application filed October 18, 1917, Serial No. 197,272. Renewed July 31, 1919. Serial No. 314,425.

*To all whom it may concern:*

Be it known that we, HENRY PHELPS GAGE and WILLIAM CHURCHILL, citizens of the United States of America, and residents of Corning, New York, have invented certain new and useful Improvements in Condensing Systems for Optical Projecting Apparatus, of which the following is a specification.

When concentrated filament incandescent lamps are used for the illumination of picture projecting apparatus, difficulty has been experienced in obtaining proper uniformity in the illumination of the projected picture. This arises from the fact that the source of light in such case does not consist of a single point of considerable area, as is the case with the arc or calcium lights, but consists of a number of illuminated bands or strips. With the type of condenser at present employed, namely, one either entirely free from positive spherical aberration or containing some positive spherical aberration, the light from sources such as those last named is thrown on the slide or film, not in a uniform field, but in a field which consists of a dark central portion surrounded by a bright ring, if positive spherical aberration is present; or, in a uniformly illuminated field, if spherical aberration is absent. If the source of illumination does not consist of a single light surface, but consists of a plurality of separated surfaces, the light from each surface is projected with either construction of the condenser in such a manner, that the superimposition on the slide or film of the fields from the several points results in a spotty and irregular or banded field of illumination, and the projection on the screen of an illuminated area having this same defect.

We propose to obviate these defects when a concentrated filament incandescent lamp is used by using condensers of such character that the beam from each point of the source of illumination projected on the slide or film by the condenser as a whole is not sharply focused upon the slide or film.

In the preferred form of our invention this is accomplished by constructing the condenser lens with negative spherical aberration, whereby the outer portions of the lens are given greater focal lengths than the inner portions thereof, the increase in such focal lengths being gradual whereby an abrupt transition in the illumination of the slide or film between the bright inner and the less bright outer ring is prevented, and each point of the light source is thrown on the screen or film in a bright center surrounded by a less bright edge, the illumination of which gradually decreases from the bright central portion outwardly. By this means an illumination from the several light points when super-imposed on the screen merge into each other without abrupt transitions.

The desired negative spherical aberration of the condensing lens may be obtained by the use of a condensing lens of the Fresnel type in which the several zones are so constructed that the rays passing through each zone from each point of the light source intercept the plane of the picture to be projected in an annulus, the annuli so formed by the rays passing through the same zone from different points of the light source being decentered in respect to each other, in accordance with the law of principal and secondary axes, and that the annular fields of illumination so produced at the plane of the picture to be projected by the decentered annuli formed by the several individual zones, are concentric with and overlap each other, and in which the central bull's eye is designed to illuminate evenly the center of the picture to be projected, whereby each zone illuminates all but the center of such picture, the focal length of the zones being less than the focal length of the bull's-eye. We may, however, use as a condenser, a lens having a convex aspheric uniform surface, or by using a deeply curved negative lens as one of the elements of the condenser.

Figure 1 is a diagrammatic view of a condensing system embodying our invention.

Figs. 2 and 3 illustrate the fields of illumination produced by a lens of positive spherical aberration from a point and a multi-point source, respectively.

Fig. 4 illustrates the field of illumination produced from a point source by a lens embodying this invention and having negative spherical aberration.

Figure 5:
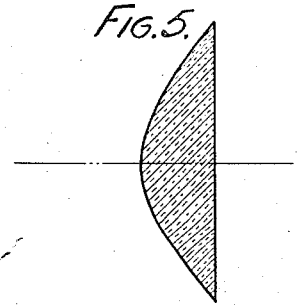
Figs. 5, 6, 7, 8, 9 and 10 illustrate other forms of lenses embodying our invention.

Referring to Fig. 1 which illustrates a condensing system containing our invention, A is a light source shown in the form of a concentrated filament tungsten lamp, hereinafter referred to as a banded light source from the fact that the convolutions of its filaments while close together are separated slightly from each other, whereby the illumination of such light source is not uniformly distributed, there being both dark and light bands within the area which incloses such light source; B is a spherical reflector having its center of curvature at the center of the light source; C is a condensing lens containing our invention; D is a picture slide or film located at the projecting aperture E of a projecting lantern, while F are the projecting lenses, by which an image of the picture is thrown on the screen G.

If the condenser lens at C be, as is usual, one having more or less positive spherical aberration, and if the light source be in the form of a single small area, the illuminated field produced at the aperture E located in front of the principal focus of the lens, has a slightly illuminated center surrounded by a sharply defined bright band as illustrated in Fig. 2. If the light source, instead of being a single area, consists of a series of surfaces, the illuminated field produced at the aperture E consists of a plurality of dark centers surrounded by sharply defined bright bands, these overlapping each other, producing a mottled and non-uniform field of illumination as shown in Fig. 3.

If, however, the condensing lens, instead of projecting to the aperture a slightly illuminated center with the bright band of Fig. 2, produces a strongly illuminated center with a gradual loss of illumination near its edges as is shown in Fig. 4, it will, when used in connection with a light source consisting of a series of bands, produce a field of illumination in which the illumination from the several bands when superimposed on each other imperceptibly merge and blend together.

An illumination of this kind may be produced in several ways, all falling within the scope of this invention.

Referring to Fig. 1, the condensing lens shown therein is of the Fresnel type, in which the central bull's eye $C'$ is so shaped as to evenly illuminate from a point source, the slide or film D at the aperture E, while each zone $C^2$, $C^3$, $C^4$, and $C^5$ thereof, evenly illuminates all but the center of the film, the fields of illumination on the slide or film produced by the several zones overlapping each other, and at least some of them, and preferably all, overlapping the field of illumination produced by the bull's eye. This may be accomplished by so proportioning the refractive power of the several zones that rays passing through each zone from each point of the light source intercept the plane of the picture to be projected in an annulus, the annuli so formed by the rays passing through the same zone from different points on the light source being decentered in respect to each other, in accordance with the law of principal and secondary axes, and so that the annular fields of illumination so produced at the plane of the picture to be projected by the decentered annulus formed by individual zones are concentric with and overlap each other, and preferably so that each zone so refracts rays from the source that they cross the principal focal axis, in rear of the focal point of the bull's eye, but in front of the aperture, and at increasing distance therefrom as the zones are farther from the center. While we have shown the Fresnel lens as of the inverted type, it is obvious that our invention is not restricted to this particular type of lens, although such lens is advantageous over the optical type in that there is less loss of light in the lens itself.

In Fig. 5, we have shown a condensing lens also having a negative, spherical aberration, this being accomplished by a non-spherical shaping of the light-collecting surface.

Figure 6:
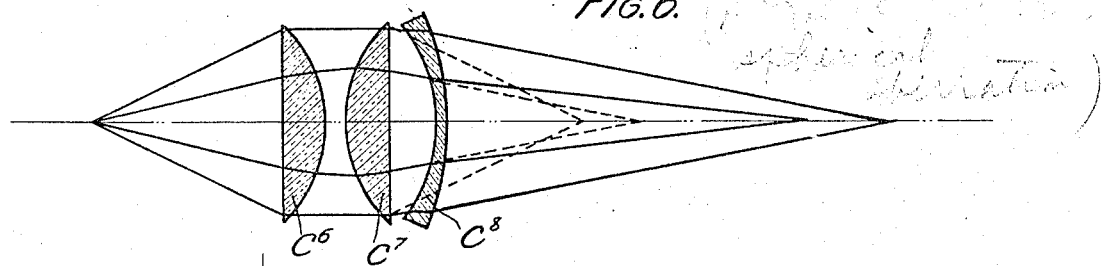

In Fig. 6, another type of a collecting lens having a negative spherical aberration is shown, and in this the collecting lens consists of three elements $C^6$, $C^7$ and $C^8$, one $C^8$ of which is a deeply concaved lens of such curvature and refractive index as to produce the desired result. In this figure, the path taken by certain rays if the concave lens were absent is shown in dotted lines.

Figure 8:
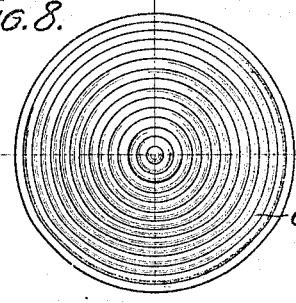
Figure 7:
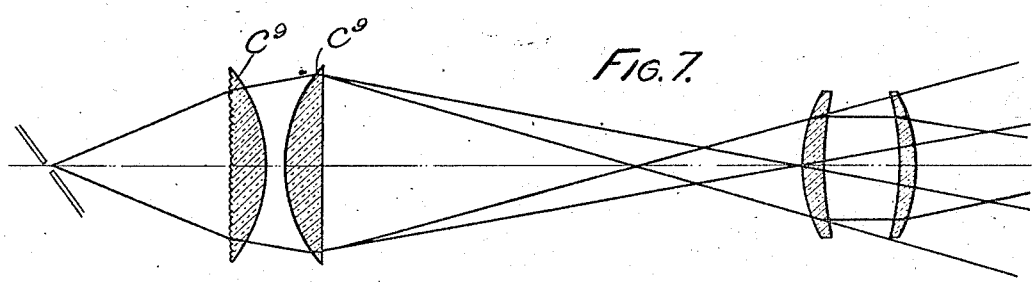
Figure 9:
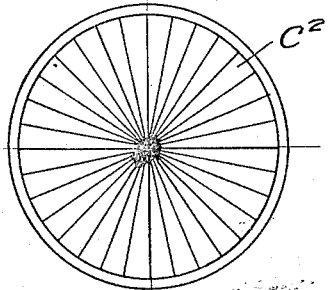

The detrimental dimly illuminated center with the contrasting bright ring from a point source may be also obviated by placing circular refracting faces $c$ (see Fig. 8) on the plane-emissive surface of one or both of the plano-convex condenser $C^9$ lenses now in common use, these being illustrated in Fig. 7, or by placing upon the same face of a similar lens, a series of radial refracting ridges $C^2$ as is shown in Fig. 9. To obtain the best results, these ridges whether circular or radial, should cover the entire surface of the condenser, and should not, in themselves, cause a refraction of the rays passing therethrough of more than three or four degrees.

Figure 10:
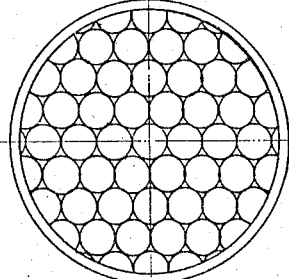

If desired, the plain face of the condenser, instead of being provided with a series of ridges before described, may be provided with a series of bull's eyes, as shown in Fig. 10, whose refractive power could be limited in the manner before stated.

Having thus described our invention, what we claim, and desire to secure by Letters Patent is,—

1. In a system for picture projection, the combination of a light source, a condensing lens, and a projecting lens, the condensing lens being of such a character that the field of illumination produced by the converging rays projected thereby from a point source gradually increases in intensity toward its center.

2. In a system for picture projection, the combination with a banded light source, of a condenser, and a projecting lens, the condenser being of such a character that the illumination produced by the converging rays projected thereby from each band of the light source consists of a bright center surrounded by a gradual decreasing zone of illumination.

3. In a system for picture projection, the combination with a banded light source, of a condenser, and a projecting lens, the condenser having negative spherical aberration.

4. In a system for picture projection, the combination with a banded light source, of a condenser, and a projecting lens, the condenser having negative spherical aberration with the foci of its several parts located beyond the picture to be projected.

5. In a system for picture projection, the combination with a banded light source, of a condenser, and a projecting lens, the condenser consisting of a Fresnel lens, the zones of which refract the light from the source so that it crosses the principal axis in rear of the focus of the bull's eye, and in front of the picture to be projected.

6. In a system for picture projection, the combination with a banded light source, of a condenser, and a projecting lens, the condenser consisting of a Fresnel lens, the bull's eye of which has a focus located beyond the point at which rays from the zones cross the principal axis, and each zone producing divergent beams, the beams from the several zones overlapping each other at the plane of the picture to be projected.

7. In a system for picture projection, the combination with a banded light source, of a condenser and a projecting lens, the condenser consisting of a Fresnel lens, the several zones of which each refracts the rays from different points of the source to form an illuminated annular field at the plane of the picture to be projected, such illuminated field being composed of decentered annuli each of which is formed by rays emanating from different points, and the several fields produced by the several zones overlapping each other.

8. In a system for picture projection, the combination with a banded light source, of a condenser and a projecting lens, the condenser consisting of a Fresnel lens, the several zones of which each refracts the rays from different points of the source to form an illuminated annular field at the plane of the picture to be projected, such illuminated field being composed of decentered annuli each of which is formed by rays emanating from different points, and the several fields produced by the several zones overlapping each other, the Fresnel lens having a bull's-eye illuminating the space within the illuminated annuli formed by one of the zones.

HENRY PHELPS GAGE.
WILLIAM CHURCHILL.

Witnesses:
EMILIO PASCUCCI,
ANNA MARGARET HAAR.